United States Patent [19]
Walter et al.

[11] 3,777,865
[45] Dec. 11, 1973

[54] COMBINED CLUTCH AND FLEXIBLE COUPLING

[76] Inventors: Jürgen Walter, Markische strasse 24; Bernhard Hackforth, Heerstrasse 52d, both of Wanne-Eickel, Germany

[22] Filed: Mar. 20, 1972

[21] Appl. No.: 235,935

[52] U.S. Cl. ............ 192/70, 192/85 AB, 192/106.1, 188/71.4
[51] Int. Cl. ............................................. F16d 13/34
[58] Field of Search .............. 192/70, 70.17, 85 AB, 192/106.1

[56] References Cited
UNITED STATES PATENTS

| | | | |
|---|---|---|---|
| 2,560,515 | 7/1951 | Pentz | 192/70 X |
| 1,927,358 | 9/1933 | Breguet | 188/71.4 |
| 1,818,610 | 8/1931 | Eaton | 192/55 X |
| 1,723,886 | 8/1929 | Pfaff | 192/70.17 |
| 1,564,717 | 12/1925 | Scruby et al. | 192/70 X |
| 2,105,188 | 1/1938 | Guy | 192/70.17 |
| 2,253,284 | 8/1941 | Bertrand | 192/70 |
| 2,301,600 | 11/1942 | Wilson | 192/70.17 X |
| 2,352,829 | 7/1944 | Forbes | 188/71.4 X |
| 2,808,129 | 10/1957 | Kraus | 188/71.4 |

*Primary Examiner*—Allan D. Herrmann
*Attorney*—Arthur O. Klein

[57] ABSTRACT

Combined clutch and flexible shaft coupling, wherein each of two ring-shaped coupling parts movable axially with respect to each other are connected with a hub part, that is adapted to be fastened on a first shaft, by at least one metal spring disc which is yieldable in an axial direction. The movable coupling parts are pressable in opposite directions from a middle resting position in which the clutch is disengaged, with outer friction surfaces on the coupling parts spaced from inner friction surfaces that are situated opposite them, on the coupling case; such case is adapted to be connected to a second shaft. The movable coupling parts are flexibly affixed in all directions, the outer edges of the spring discs being secured to the respective axially movable parts of the coupling by elastic intermediate members.

14 Claims, 10 Drawing Figures

COMBINED CLUTCH AND FLEXIBLE COUPLING

This invention relates to a combined clutch and flexible coupling wherein two ring-shaped coupling parts that are axially movable with respect to each other are disposed within a coupling case, the coupling case and the coupling parts having mutually coacting confronting friction surfaces. Connection between the coupling parts and the case is accomplished by means of selectively controlled pressure means which can be inserted between the coupling parts. Each coupling part is attached to a hub, which is adapted to be attached to a first shaft, by at least one metal spring disc which is yieldable in an axial direction. The case is adapted to be connected to a second shaft, disposed coaxial of the first shaft.

In a known coupling of this type, disclosed in British Pat. No. 634,230 and German Pat. No. 645,786, two metal spring ring discs are firmly clamped at their outer edges to the movable coupling parts, the inner edges of such discs being clamped to a hub part. In such coupling the movable coupling parts move axially away from and toward each other in the amount necessary for the coupling and uncoupling, respectively, of the clutch, the deformability of the spring ring discs permitting such movement of the coupling parts. Furthermore, the spring ring discs permit minor angular displacements of the coupling case and the coupling hub relative to each other, the spring ring discs maintaining the movable coupling parts on the one hand and the hub on the other in fixed positions relative to each other in both radial and turning directions about the axis of the shafts.

In other selectively controllable shaft couplings or clutches which are known, the movable coupling parts are connected with the hub part by means of ring discs that are made out of rubber or rubber-like material. Such couplings, for example, are shown in U.S. Pat. Nos. 2,619,212 and 2,621,769. Here the movable coupling parts are flexible in all directions relative to the hub part and the shaft that carries the hub part. This means that apart from angular deformations of the shafts that are coupled together, the two shafts may be axially and radially displaced with respect to each other, the rubber or rubber-like parts opposing such relative movement. However, selectively operable clutch-couplings that employ soft, elastic mounting means for the coupling parts require special means for the mutual guidance of the elements of the coupling bearing the opposed friction surfaces. Such special means are necessary to prevent undesired contact between the opposed friction surfaces when the clutch-coupling is uncoupled or disengaged.

The above-described special means or measures that are taken to guide such parts include the keeping of the space between the friction surfaces of the movable coupling parts and the friction surfaces of the case relatively large, which results in a correspondingly long movement of the parts between clutch-engaged and clutch-disengaged positions. In another of these constructions, the movable coupling parts, when the coupling is released, are pulled against a thrust disc that is arranged between such parts or between the spring ring discs on hub part which carries them whereby the coupling parts are centered in the middle of the case in an axial direction or in axial and radial directions. Such constructions are shown in German Pat. Nos. 645,786 and 1,187,865, and British Pat. No. 634,230. Couplings of this type which are adapted for the transmission of higher torques (for propeller motors and the like) have rubber elastic rings, which connect the movable coupling parts with the hub part, which are of undesirably large axial dimensions.

This invention is directed to the provision of an improved combined clutch and coupling of the above first-mentioned type, that is, the coupling in which the movable coupling parts are connected with the hub part by means of spring ring discs made of a practically inflexible material, for example, metal. The clutch-coupling of the present invention on the one hand is capable of sustaining large axial displacements and angular dislocations of the two shafts which it couples, as well as radial displacements of such shafts. Such coupling, furthermore, is sufficiently flexible in the direction of its rotation about the common axis of the shafts to absorb impact strains when coupling and uncoupling the shafts, as well as yielding elastically to compensate for minor differences in the turning motions of the two coupled shafts. The spring ring discs are capable, on the one hand, of keeping the movable coupling parts stably in the clutch-disengaged position, with the necessary distances between the friction surfaces of the coupling parts and the friction surfaces of the case.

In accordance with the invention, these results are accomplished by means of a selectively operable combined clutch and coupling, such device being so constructed and arranged that the movable coupling parts are fixed to the outer edges of the spring ring discs by elastic intermediate members that are flexible in all directions. The elastic intermediate members yield to compensate for the changes in the radial dimensions of the outer edges of the spring ring discs that occur when the discs are deflected. The compensation afforded by such intermediate members is considerably better than that provided by the spring ring discs themselves, and therefore permit a greater length of travel between the axially movable parts as they move between their clutch-engaged and clutch-disengaged positions; this considerably reduces the power required for moving the parts of the coupling between such two positions.

Furthermore, by an appropriate choice of the materials from which the spring ring discs and the intermediate elastic members are made, as well as by the shape and dimensions of these parts of the coupling, there can be attained in the coupling a flexibility that is sufficient to absorb coupling and uncoupling impacts, to yield elastically when subjected to oscillatory movements of one shaft with respect to the other shaft, and also to yield axially upon the axial movement of one shaft with respect to the other.

The elastic intermediate members are preferably made of rubber or rubber-like materials. Such members are advantageously, under upsetting or compressive forces during use; the flexibility of such intermediate members may be varied, as dictated by the different requirements of the flexibility of a particular coupling. The flexibility of the coupling in all, or in certain, directions can be increased considerably under certain circumstances. The connections between the inner edges of the spring ring discs with the hub part may be identical with or at least similar to the connections between the discs and the movable coupling parts.

The invention is illustrated by way of example in the accompanying drawings which form part of the application and in which.

Figure 1:
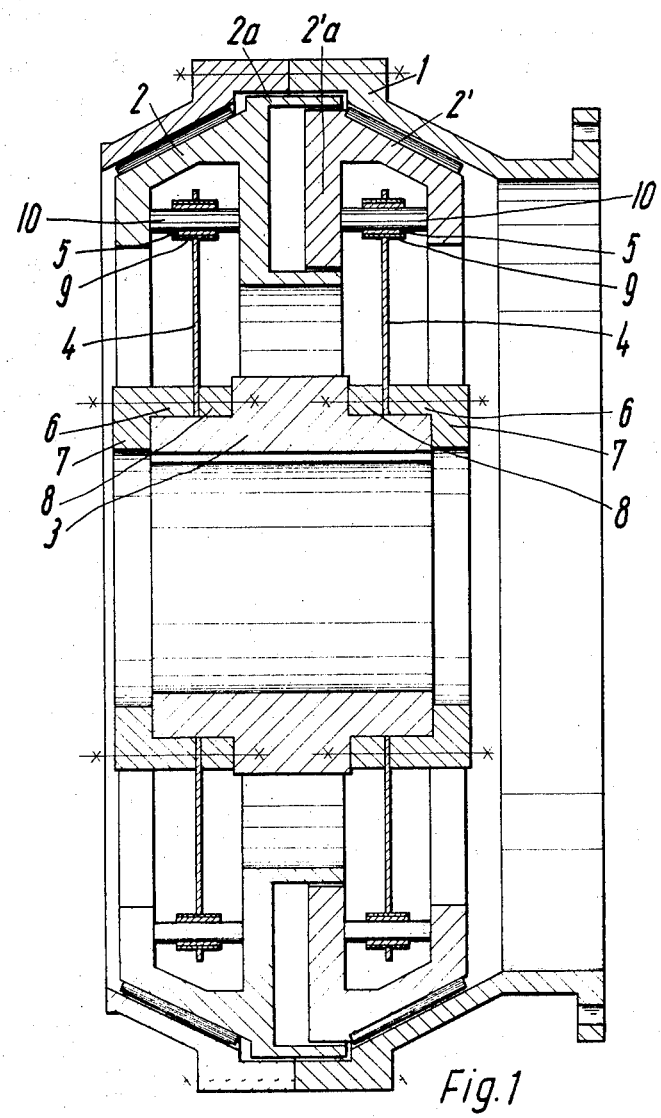
FIG. 1 is a somewhat schematic view in vertical axial section of a selectively controllable combined clutch and flexible coupling of the double tapered muff type in accordance with the invention.

Turning now to FIG. 1, there is there shown a first embodiment of combined clutch and coupling in accordance with the invention, such device being a double tapered muff coupling. This device has a two-part case 1 that is adapted to be connected to a (second) shaft. The case has two similar confronting frusto-conical friction surfaces, such friction surfaces selectively co-operating with confronting frusto-conical surfaces of the same apex angle on two axially movable coupling parts 2, 2'. In FIG. 1 the coupling parts 2, 2' are shown moved axially toward each other, so that the friction surfaces thereon are spaced from the friction surfaces on the case. The axially inner end 2a of the coupling part 2 is made in the form of a chamber containing an annular space, whereas the axially inner end 2'a of the coupling part 2' is made in the form of an annular piston fitting within the annular space or cylinder of the part 2a. When the coupling parts 2, 2' are thrust axially away from each other, as by the introduction of a fluid under pressure into the annular cylinder, the coupling parts 2, 2' are thrust axially apart so that their friction surfaces strongly engage the friction surfaces on the case. The coupling parts 2, 2' then revolve as a whole with the coupling case.

The movable coupling parts 2 and 2' are connected with a hub part 3, disposed coaxially of the case 1, part 3 being adapted to be affixed as by a spline connection to another (first) shaft, not shown. Each of the coupling parts 2 and 2' is connected to the hub by a spring ring disc 4, preferably made of spring metal such as steel, the discs 4 being distortable in a direction coaxial of the hub 3. In the construction shown in FIG. 1 the ring discs 4 are connected in a known manner to the hub part 3. Thus the spring discs 4 are pressed axially onto the cylindrical end portions of the hub part 3 and are retained by tightening screws 6 (schematically shown) that are distributed along the inner edge of the discs. Each of such connections also includes an outer pressure ring 7 and an inner spacing ring 8, such rings being pulled against the axially outer face of the central, larger diametered portion of the hub 3. It will be seen that such connections 6, 7, 8 are inflexible.

In contrast to the inflexible attachment of the inner edge or rim of the spring discs 4 to the hub part 3, the outer edge of each such disc 4 is connected to the respective movable coupling parts 2 and 2' by mounting means which are flexible in all directions. Each of the movable coupling parts 2, 2' has an axially outer annular skirt and a confronting axially spaced inner flange, the inner flange on the part 2 being the end of the annular cylinder therein and the inner flange on the part 2' being the annular cylinder thereon. Spanning the axially inner and outer flanges of each of the parts 2 and 2' are a plurality of studs 10, disposed parallel to the axis of the hub 3, the members 10 being angularly spaced about the axis of the coupling. Telescoped over each of the members 10 is a rubber or rubber-like sleeve 5, sleeve 5 being held in compression by a metal sleeve 9 which tightly embraces and upsets the sleeve 5, the sleeve 9 being rigidly attached to the outer edge of the spring disc 4. It will be seen that the spring discs 4 and the metal sleeves 9 on the one hand and the rubber or rubber-like sleeves 5 and the studs 10 on the other hand are firmly attached to each other, so that displacements of the movable coupling parts 2 and 2' which are disposed opposite the hub part 3 can occur only when there are elastic deformations of the spring ring discs 4 and of the rubber coupling sleeves 5.

When the clutch-coupling is in its clutch-disengaged position, that is to say, when the cylinder-piston unit 2a, 2'a is not supplied with fluid under pressure, the spring ring discs 4 and the rubber sleeves 5 hold the movable coupling parts 2, 2' with a space between the friction surfaces on such parts and the confronting friction surfaces on the case 1. Thus the first and second shafts connected to the coupling are drivingly disengaged.

When the space within the cylinder and piston is provided with fluid under pressure, however, the coupling parts 2, 2' are thrust axially apart, their frictional driving surfaces engage those of the case, and there is a fixed driving connection between the shaft connected to the hub 3 and the shaft connected to the case 1. Such axially outer movement of the coupling parts, as above-explained, entails a resilient or elastic deformation of the spring discs 4 and of the rubber sleeves 5. When the pressure between the cylinder and piston is released, such resilience of the parts 4, 5 urges the coupling parts 2, 2' toward each other into the position shown in FIG. 1, so that the two shafts are again uncoupled.

Figure 2:
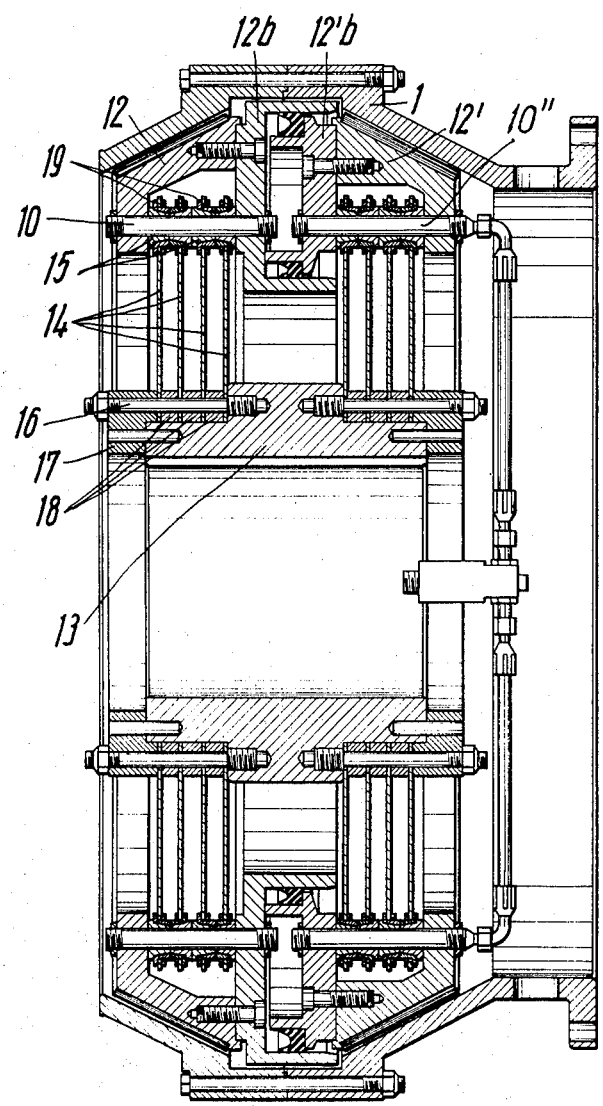
FIG. 2 is a view in vertical axial section through a second embodiment of combined clutch-coupling in accordance with the invention.
Figure 4:
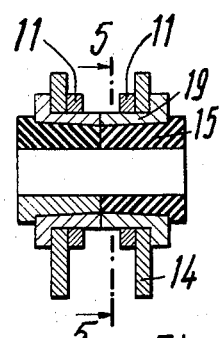
FIG. 4 is a fragmentary view in vertical section through one of the intermediate connecting means between two spring ring discs and a movable coupling part.
Figure 5:
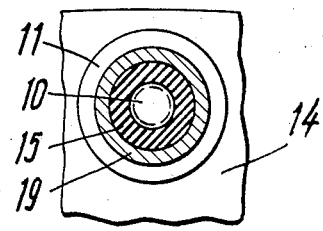
FIG. 5 is a view in horizontal section through the intermediate connecting means shown in FIG. 4, the section being taken along the line 5—5 of FIG. 4.
Figure 3:
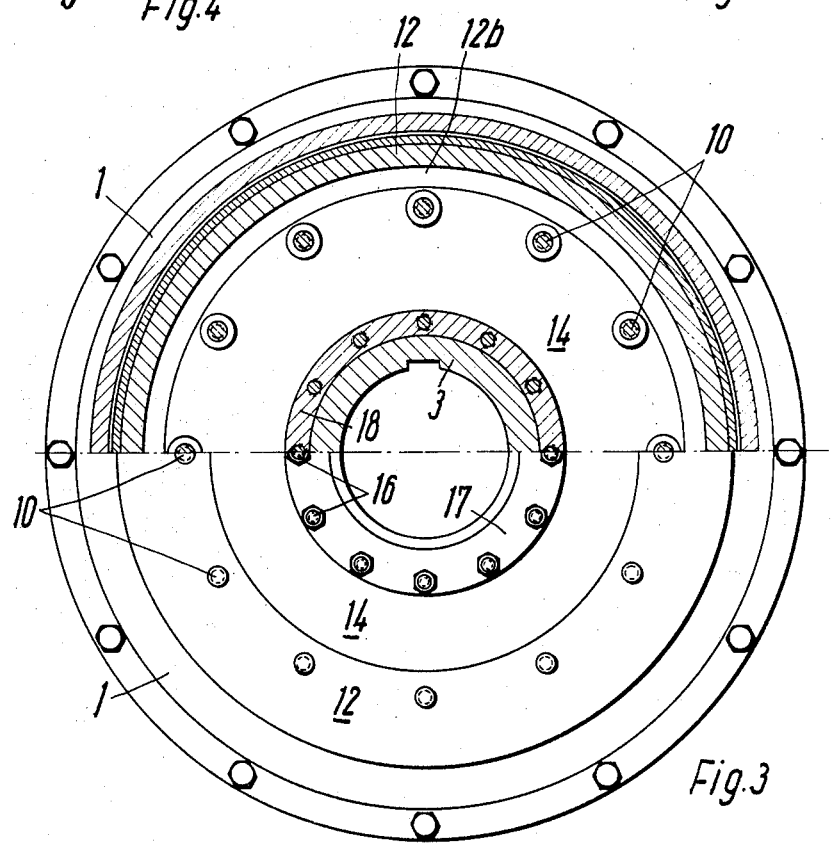
FIG. 3 is a view partially in front elevation and partially in horizontal section of the coupling shown in FIG. 2.

In the embodiment of combined clutch and coupling illustrated in FIGS. 2–5, inclusive, each of the movable coupling parts 12, 12' is connected to the hub part 13 by means of two pairs of spring ring discs 14 that are disposed parallel to each other and transverse to the axis of rotation of the coupling. The inner edges of discs 14 are connected to the hub by a plurality of screws 16 which are angularly spaced about the hub, there being outer pressure rings 17 and spacer rings 18 which are pulled against the axially annular outer surfaces of the larger-diametered central part of the hub 13. In this embodiment also, as in the first-described embodiment, the outer edges of the spring ring discs 14 are connected to the movable coupling parts 12, 12' so as to be flexible in all directions. For this purpose, over the outer edges of the spring discs 14 there are distributed metal sleeves 19 which are rigidly attached to the discs. The construction of such sleeves is shown most clearly in FIGS. 4 and 5. Thus, for each pair of discs 14 there are employed a pair of sleeves 19 which are similar in construction but oppositely disposed, each of sleeves 19 has a flange on its axially outer edge, the axially inner, unflanged ends of the confronting sleeves 19 engaging each other as shown. Retaining washers 11 pressed on to the sleeves 19 so as to retain the spring discs 14 between them and the flanges on the ends of the sleeves. Telescoped over cross rods or studs 10, which are disposed similarly to such members 10 in the construction of FIG. 1, are a plurality of rubber or rubber-like sleeves 15 which are tightly compressively received within the metal sleeves 19 so as to be distorted or upset thereby. As shown in FIG. 2 as well as in FIG. 4, the compression of the rubber sleeves 15 by the sleeves 19 results in the axial extrusion of the rubber sleeves so that there are formed flanges on the axially outer ends of the sleeves 15, such sleeves being of somewhat greater length than the sleeves 19, as shown. The thus extruded flanges on the ends of the sleeves 19 of the respective pairs of discs 14 act as spacers for the discs, to space them axially of each other as shown in FIG. 2.

In the construction shown, the inner surfaces of the sleeves 19 are of frusto-conical shape (FIG. 4) such surfaces shallowly converging toward each other in the sleeves 19 for each pair of discs 4. The sleeves 19, form with the cross members 10, which pass through them, connections between the respective coupling part 12, 12' and the spring discs 14.

The above referred to upsetting pressure upon the rubber or rubber-like sleeves 15 results from the fact that the confronting sleeve pairs 19 and 15 are held under forcible axial compression between the parts 12, 12b on the one hand, and 12', 12'b on the other, which form the respective axially movable parts of the coupling. Such parts are held together so as to compress the connecting means 15, 19 therebetween by the threaded bolts or studs 10", as shown in FIG. 2.

As in the embodiment of FIG. 1, the second embodiment of the clutch coupling of the invention has means whereby the opposed, axially movable coupling parts are thrust axially away from each other whereby to engage the clutch. In FIG. 2 there is shown a fluid distributing system including an axially disposed fluid-entering fitting, conduits disposed radially thereof, and members 10" at the right in FIG. 2, members 10" being hollow and serving to conduct fluid under pressure into the interior of the annular cylinder in the part 12b.

Figure 6:
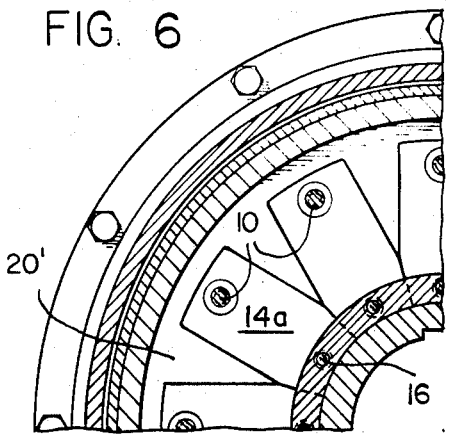
FIG. 6 is a fragmentary view in end elevation of a second embodiment of flexible disc member connecting the hub and the coupling parts.
Figure 7:
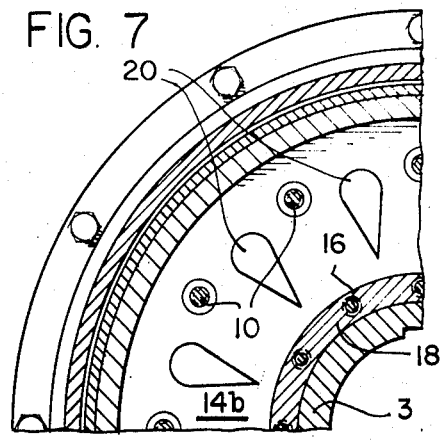
FIG. 7 is a similar view of a third embodiment of such flexible disc.
Figure 8:
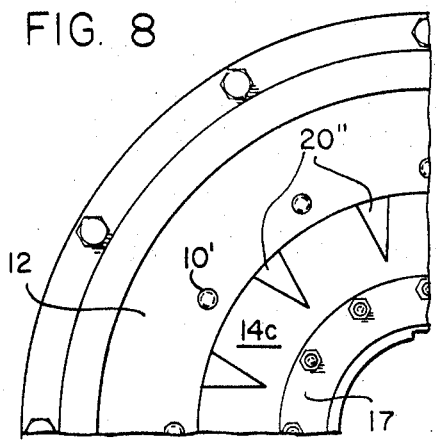
FIG. 8 is a similar view of a fourth embodiment of such flexible member.
Figure 9:
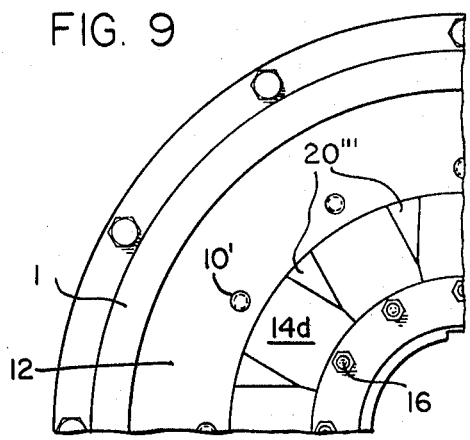
FIG. 9 is a similar view of a fifth embodiment of such flexible member.

FIGS. 6, 7, 8, and 9 show four additional embodiments of flexible spring discs which may be employed in the clutch-coupling of the present invention. In FIG. 6 the spring ring discs 14a are provided with inwardly converging openings 20' which are open at their radially outer ends. In FIG. 7 the spring ring discs 14b provided with inwardly converging openings 20, such openings having curved radially outer ends. In FIG. 8 the spring ring discs 14c are continuous, but are provided with inwardly converging triangular openings 20" in their radially outer edges. In FIG. 9 the spring ring discs 14d are made up of a plurality of separate generally radially disposed spring sheet members which abut at their roots and have radially inwardly converging triangular-shaped openings 20''' in their radially outer edges. The constructions of FIGS. 6-9, inclusive, may be used where it is desired to change the elasticity of the spring ring discs. It is also possible to provide such discs with impressed radial or ring-shaped reinforcing seams (not shown) so as to change the elasticity of the spring ring discs.

Figure 10:
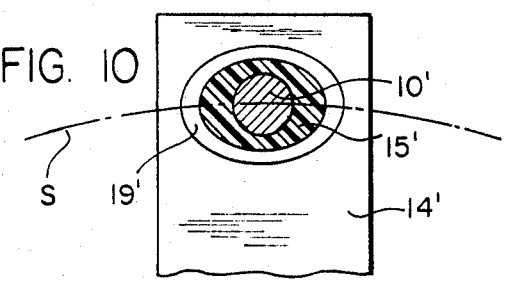
FIG. 10 is a view similar to FIG. 5 of a further embodiment of connection between a spring ring disc and a movable coupling part.

In FIG. 10 there is shown a further embodiment of flexible connection between a spring ring disc and a movable coupling part. The parts shown in FIG. 10 are designated by the same reference characters as those employed in FIG. 5 with added primes. In the embodiment of FIG. 10 the metal sleeve 19' is of oval cross-section and the rubber sleeve 15' has a similar external configuration, so as to fit snugly within the sleeve 19'. The common longer axis of the ovals of the spring sleeve and the rubber sleeve are disposed along the path S of rotation of the member 14'. This increases the flexibility of such connection in the vertical direction in FIG. 10 with respect to that in the direction S. It is to be understood, however, that the common longer axes axis of the sleeve 19' and the rubber sleeve 15' may be disposed in directions other than as shown in FIG. 10, so as to arrive at other relationships of the flexibility of the connection in the respective circumferential and radial directions of the coupling.

Although the invention is illustrated and described with reference to a plurality of embodiments thereof, it is to be expressly understood that it is in no way limited to the disclosure of such a plurality of embodiments, but is capable of numerous modifications within the scope of the appended claims.

What is claimed is:

1. In a selectively engageable elastic shaft clutch-coupling having a coupling case, two ring-shaped movable coupling parts within the coupling case, each coupling part being connected with a hub part that is adapted to be fastened to a first shaft by at least one metal disc which is resiliently yieldable in an axial direction, the movable coupling parts being pressable axially outwardly in opposite directions from an inner, clutch-disengaged resting position to an outer, clutch-engaged position, the coupling parts having outer friction surfaces selectively engaging inner friction surfaces being situated opposite the first such surfaces with an interval between them when the clutch is disengaged, the coupling case being adapted to be connected to a second shaft, the improvement which comprises an intermediate connecting means connecting the movable coupling parts to the hub, the connecting means being elastically yieldable in all directions, such last-named means connecting the outer edges of the resilient discs to the respective coupling parts.

2. An elastic shaft clutch-coupling according claim 1, wherein said connecting means includes elastic members made of rubber-like material.

3. An elastic shaft clutch-coupling according to claim 2, wherein the rubber-like parts are sleeves under radially directed pressure.

4. An elastic shaft clutch-coupling according to claim 2, wherein the rubber-like parts are inner sleeves, said inner sleeves being compressively held within outer metal sleeves, and a stud extending through the inner sleeve and being compressively engaged thereby, the stud being disposed parallel to the axis of rotation of the clutch-coupling, one of each set of the elements: outer sleeve and stud being rigidly connected to the respective coupling part and the other being connected to the outer edge of the resilient disc.

5. An elastic clutch-coupling according to claim 4, wherein the stud is connected to a coupling part and the outer sleeve is connected to the outer edge of the resilient disc.

6. In a selectively engageable elastic shaft clutch-coupling having a coupling case, two ring-shaped movable coupling parts within the coupling case, coupling part being connected with a hub part that is adapted to be fastened to a first shaft by at least one metal disc which is resiliently yieldable in an axial direction, the movable coupling parts being pressable axially outwardly in opposite directions from an inner, clutch-disengaged resting position to an outer, clutch-engaged position, the coupling parts having outer friction surfaces selectively engaging inner friction surfaces being situated opposite the first such surfaces with an interval between them when the clutch is disengaged, the coupling case being adapted to be connected to a second shaft, the improvement which comprises an intermediate connecting means connecting the movable coupling parts to the hub, the connecting means being elastically yieldable in all directions, such last-named means connecting the outer edges of the resilient discs to the respective coupling parts, said connecting means including elastic members made of rubber-like material. The rubber-like parts are inner sleeves, said inner sleeves being compressively held within outer metal sleeves, and a stud extending through the inner sleeve and being compressively engaged thereby, the stud being disposed parallel of the axis of rotation of the clutch-coupling, one of each set of the elements; outer sleeve and stud being rigidly connected to the respective coupling part and the other being connected to the outer edge of the resilient disc, the openings through the outer sleeves taper in one axial direction so that the rubber-like inner sleeves may be inserted into the outer sleeves by means of axially directed pressure.

7. An elastic shaft clutch-coupling according to claim 6, wherein each connecting means comprises a pair of coaxial outer sleeves, the passages through such outer sleeves tapering in opposite directions, the inner sleeves being somewhat longer in an axial direction so that their outer ends protrude beyond the outer ends of the outer sleeves when the inner ends of the inner sleeves are in engagement, and means engaging and axially compressing the outer ends of the inner sleeves.

8. An elastic shaft clutch-coupling according to claim 7, wherein the means axially compressing the inner sleeves of the pairs of sets of outer and inner sleeves forming connecting means comprise bolts passing through the inner sleeves and connected to the respective coupling parts, there being a plurality of such bolts parallel to the axis of the coupling and angularly spaced thereabout, each such bolt passing through the inner sleeves of a plurality of connecting means.

9. An elastic shaft clutch-coupling according to claim 1, wherein the resilient discs are connected with the hub part by elastic intermediate members which are elastically yieldable in all directions.

10. An elastic shaft clutch-coupling according to claim 3, wherein the passages through the outer sleeves and the mating outer surfaces of the inner sleeves have a non-round transverse section.

11. An elastic shaft clutch-coupling according to claim 10, wherein the section of the passages through the outer sleeves have a single longest axis, and said longest axis is disposed parallel to the path of rotation of the connecting means.

12. An elastic shaft clutch-coupling according to claim 1, wherein the resilient discs, in order to increase their flexibility, are provided with openings therethrough.

13. An elastic shaft clutch-coupling according to claim 12, wherein said openings through the discs are closed to the outer edges of the discs.

14. An elastic shaft clutch-coupling according to claim 12, wherein said openings through the discs are open to the outer edges of the discs.

* * * * *